United States Patent [19]

Stenger et al.

[11] Patent Number: 5,185,189
[45] Date of Patent: Feb. 9, 1993

[54] MULTILAYERED TUBULAR PACKAGING CASING

[75] Inventors: Karl Stenger, Ruedesheim; Marliese Saal, Heidesheim, both of Fed. Rep. of Germany

[73] Assignee: Hoechst Aktiengesellschaft, Frankfurt am Main, Fed. Rep. of Germany

[21] Appl. No.: 706,362

[22] Filed: May 28, 1991

[30] Foreign Application Priority Data

May 26, 1990 [DE] Fed. Rep. of Germany ....... 4017046

[51] Int. Cl.$^5$ .................... F16L 11/00; B65D 81/34
[52] U.S. Cl. .................. 428/34.8; 428/475.8; 428/476.1; 428/35.7; 428/36.6; 138/118.1
[58] Field of Search .............. 428/34.8, 475.8, 476.1, 428/35.7, 36.6; 138/118.1

[56] References Cited

U.S. PATENT DOCUMENTS

| | | | |
|---|---|---|---|
| 4,243,074 | 1/1981 | Strutzel et al. | 428/34.8 |
| 4,303,711 | 12/1981 | Erk et al. | 428/34.8 |
| 4,394,485 | 7/1983 | Adur | 525/74 |
| 4,401,256 | 8/1983 | Krieg | 428/475.8 |
| 4,560,520 | 12/1986 | Erk et al. | 264/22 |
| 4,601,929 | 7/1986 | Erk et al. | 428/34.8 |
| 4,606,922 | 8/1986 | Schirmer | 426/412 |
| 4,640,852 | 2/1987 | Ossian | 428/35 |
| 4,659,599 | 4/1987 | Strutzel | 428/34.8 |
| 4,818,592 | 4/1989 | Ossian | 428/216 |
| 4,882,894 | 11/1989 | Havens et al. | 53/461 |
| 4,886,634 | 12/1989 | Strutzel et al. | 264/560 |
| 4,888,223 | 12/1989 | Sugimoto et al. | 428/34.9 |
| 4,899,521 | 2/1990 | Havens | 53/461 |
| 4,944,970 | 7/1990 | Strenger et al. | 428/34.8 |
| 5,025,922 | 6/1991 | Havens et al. | 206/328 |

FOREIGN PATENT DOCUMENTS

| | | |
|---|---|---|
| 0305959 | 3/1989 | European Pat. Off. . |
| 0318964 | 6/1989 | European Pat. Off. . |
| 2926439 | 1/1980 | Fed. Rep. of Germany . |
| 3212343 | 10/1983 | Fed. Rep. of Germany . |

Primary Examiner—Alexander S. Thomas
Assistant Examiner—Charles R. Nold
Attorney, Agent, or Firm—Foley & Lardner

[57] ABSTRACT

A polyamide-based multilayered tubular packaging casing for pasty matter, in particular a synthetic sausage casing, is disclosed having an outer layer comprised of aliphatic polyamide, aliphatic copolyamide or a polymer blend comprising at least one of these compounds, an intermediate layer that is impermeable to water vapor and comprised of a polyolefin and an adhesion-promoting agent, and an inner layer that is preferably impermeable to oxygen and comprised of aliphatic and/or partially aromatic polyamides and/or aliphatic and/or partially aromatic copolyamides.

32 Claims, No Drawings

MULTILAYERED TUBULAR PACKAGING CASING

BACKGROUND OF THE INVENTION

1. Field of the Invention

The present invention relates to a multilayered tubular packaging casing for pasty materials, in particular a synthetic sausage casing, based on polyamide.

2. Description of the Prior Art

Polyamide based casings have gained increased importance as foodstuff packaging materials and, in particular, as synthetic sausage casings. Quite a number of different types of sausage meats require casing materials that exhibit low permeability to water vapor in order to ensure that the weight loss of the sausage as a result of water loss during storage is kept to a minimum. This will also ensure that the sausage casing surrounds the sausage meat in a tight, crease-free manner, even after relatively long periods of storage without formation of hollow spaces between the inner wall of the casing and the sausage meat where jelly pockets can form. For this purpose, it is known to combine a polyamide layer with a polymer layer whose permeability to water vapor is lower than that of the polyamide layer. There are, however, certain types of food with which even the reduced permeability of these composite films is too high to be suitable for use. For example, sausage meat of the liverwurst type discolors when it is exposed to atmospheric oxygen, and therefore casings of the type described above are not suited for these types of sausage meat. To reduce the permeability of oxygen through such casings, the polyamide film additionally requires an oxygen barrier layer.

In EP-A-0,305,959, a multilayered polyamide film is disclosed, which may, for example, be used in the form of a heat-sealable bag for packaging meat and poultry. The film has a barrier layer against oxygen and comprises an amorphous, partially aromatic copolyamide (PA 6I/6T) having units of hexamethylene diamine, terephthalic acid and isophthalic acid. This copolyamide layer constitutes the core layer of the film and is sandwiched between two polyolefin layers that form a barrier against water vapor, whereby an inner polyamide layer has the purpose of preventing moisture of the packaged food from penetrating into the copolyamide core layer. It is, however, not advantageous to use polyolefin layers as inner layers of sausage casings because they do not exhibit adequate adhesion with sausage meats and thus favor the formation of jelly pockets.

EP-A-0,127,296 (corresponding to U.S. Pat. No. 4,606,922) attempts to overcome this problem by providing an ionomer for the inner surface of a multilayered polyamide film and by treating the inner surface with ionizing radiation.

In accordance with DE-A-38 16 942 (corresponding to U.S. Pat. No. 4,888,223) the formation of creases on a multilayered polyamide casing can be avoided by subjecting the inner layer comprising a polyolefin resin to a corona discharge treatment and, optionally, by dusting the inner layer using a starch powder. The proposed solutions have the disadvantage that the inner surface must be subjected to an additional pretreatment in order to prevent the formation of creases and jelly pockets between the inner surface of the casing and the sausage meat composition.

SUMMARY OF THE INVENTION

It is an object of the instant invention to provide an improved packaging casing that avoids the problems and shortcomings of the prior art in a safe and cost-effective manner.

It is a further object of the present invention to provide an improved polyamide-based tubular packaging casing that adheres firmly to its contents after it is filled.

It is another object of the present invention to provide an improved polyamide-based tubular packaging casing that, after being filled with sausage meat, adheres firmly to the sausage meat without the problems and shortcomings of the prior art.

The casing of the present invention can be employed as a synthetic sausage casing, in particular for cooked or scalded sausages, without any problems. The casing of the present invention exhibits reduced permeability to water vapor and atmospheric oxygen. Even after storage for 4 to 6 weeks, sausages provided with the casing of the present invention do not exhibit any noticeably reduced moisture content, which would manifest itself in a reduced weight of the sausage and a creased appearance, nor is there observed any formation of jelly pockets between the inner casing wall and the sausage meat as a result of detachment of the casing from the sausage meat composition. The casing of the present invention is also suited for air-tight packaging of goods that are sensitive to air, such as sausage meat of the liverwurst type, so that these goods remain unchanged and unaffected during storage and, in particular, do not discolor undesirably.

Further objects and advantages of the present invention will be set forth, in part, in the description which follows and, in part, will be obvious from the description, or may be learned by practice of the invention. Additional objects and advantages of the invention may be realized and attained by means of the instrumentalities and combinations particularly pointed out in the appended claims. Additionally, the teachings of the U.S. patents previously noted above are incorporated herein by reference.

To achieve the foregoing objects and in accordance with the purpose of the invention, as embodied and broadly described herein, there is disclosed a multilayered, tubular packaging casing for pasty materials having an outer layer, an intermediate layer and an inner layer wherein the outer layer comprises a polymer selected from the group consisting of an aliphatic polyamide, an aliphatic copolyamide and a polymer blend containing at least one aliphatic polyamide or aliphatic copolyamide, the intermediate layer comprises a polyolefin and an adhesion promoting agent, and the inner layer comprises a polymer selected from the group consisting of an aliphatic polyamide, a partially aromatic polyamide, an aliphatic copolyamide, a partially aromatic copolyamide and a polymer blend containing at least one aliphatic polyamide, partially aromatic polyamide, aliphatic copolyamide, or partially aromatic copolyamide.

It is to be understood that both the foregoing general description and the following detailed description are exemplary and explanatory only and are not restrictive of the invention as claimed.

DESCRIPTION OF PREFERRED EMBODIMENTS

Reference will now be made in detail to preferred embodiments of the invention.

Compared to other multilayered polyamide casings with good barrier properties, the casing of the present invention has a thin wall thickness that is preferably not greater than about 60 μm and is more preferably not greater than about 45 μm. The lower limit for the wall thickness is on the order of approximately 30 μm. The diameter of the tubing is adaptable with the intended use of the casing. If the casing is used for cooked or scalded sausages, its diameter will generally be on the order between approximately 30 μm to 160 μm and preferably between approximately 40 μm to 135 μm.

The packaging casing comprises at least three layers, i.e., an outer layer, an intermediate layer and an inner layer. The outer layer and the inner layer are comprised of polyamides, and the intermediate layer is comprised of a polymer blend including a polyolefin.

The outer layer usually is thicker than the two other layers. In the case of a film having a total thickness between approximately 30 μm to 60 μm, the outer layer generally has a thickness between approximately 14 μm to 48 μm. Therefore, this outer layer can be considered the carrier layer of the multilayered casing. This outer layer also has a comparably high water absorbing capacity.

During scalding or boiling of the sausages, the outer layer absorbs water. During the subsequent cooling and storing of the sausages, this water is set free. This freeing of water from the outer layer causes the outer layer to shrink during drying, and the casing surrounds the cooled-down sausage more tightly and without creases. Since the casing is substantially impermeable to water and water vapor due to the presence of the intermediate layer, the outer layer cannot absorb any moisture from the packed sausage meat.

The outer layer essentially comprises an aliphatic polyamide, an aliphatic copolyamide or a polymer blend containing at least one of these compounds.

The aliphatic polyamide may be a homopolycondensate of aliphatic primary diamines having, in particular, 4 to 8 carbon atoms and aliphatic dicarboxylic acids having, in particular, 4 to 10 carbon atoms, or may be a homopolymer of omega-aminocarboxylic acids having 6 to 12 carbon atoms or omega-amino carboxylic lactams having 6 to 12 carbon atoms. The aliphatic copolyamide may be the same homopolycondensate or homopolymer, and may be a polymer based on one or more aliphatic diamines and one or more aliphatic dicarboxylic acids and/or one or more omega-aminocarboxylic acids or omega-aminocarboxylic lactams. Examples of suitable dicarboxylic acids include adipic acid, azelaic acid, sebacic acid and dodecane dicarboxylic acid. Suitable diamines include tetra-, penta-, hexa-, and octa-methylene diamine, with hexamethylene diamine being particularly preferred. 11-Amino-undecanoic acid is an example of an omega-aminocarboxylic acid, and epsilon-caprolactam and omega-lauric lactam are examples of lactams. Polycaprolactam (PA 6) and polyhexamethylene adipinamide (PA 66) or blends of these polyamides are particularly preferred aliphatic polyamides. The aliphatic copolyamide is made from the compounds enumerated above, and a preferred aliphatic copolyamide is made of caprolactam, hexamethylene diamine and adipic acid (PA 6/66).

The water absorbing capacity of the outer layer is higher than that of the intermediate layer and, preferably, is also higher than that of the inner layer, so that it can be soaked with water prior to the stuffing process without problems while possessing and maintaining the required smoothness and flexibility. The barrier properties of the inner layer are improved by the intermediate layer exhibiting reduced water absorbing properties. Therefore, PA 6 and PA 66 are particularly well suited for the outer layer because these two polyamides may be present in admixture with other water-absorbing polymers, including polyesters. The addition of polyester facilitates the biaxial stretching of the tubing, i.e., the stretching force required is reduced unexpectedly, and the overall strength of the casing is increased.

As is known, polyesters are condensation products of diols and aromatic dicarboxylic acids, in particular terephthalic acid and optionally also isophthalic acid. Polyesters may be modified, to a minor extent, with aliphatic dicarboxylic acids, such as adipic acid. The diols are, preferably, aliphatic compounds of the formula $HO-(CH_2)_n-OH$ (n denoting 2 to 8), such as ethylene glycol; 1,4-butylene glycol; 1,3-propylene glycol; or hexamethylene glycol; and alicyclic compounds, such as 1,4-cyclohexane dimethanol. Polybutylene terephthalate is preferably employed in the polymer blend. The polyester is usually present in an amount of 5 to 15% by weight, relative to the total weight of the polymer blend of the outer layer of the packaging casing.

In individual cases it is expedient to modify the outer polyamide layer by adding up to 25% by weight of further polymers which are compatible with the polyamide or polyamide blend. Suitable additional polymers include, for example, polyolefins, i.e., homo- or copolymers of alpha-olefins having 2 to 8 carbon atoms, in particular ethylene, propylene and butylene, preferably polyethylene, in particular LDPE and LLDPE, and also modified polyolefins carrying functional groups, of the types employed as adhesion-promoting components for the intermediate layer, such as polyolefins with carboxyl groups, i.e., groups comprising acids, esters, anhydrides and salts of carboxylic acids. By the addition of the polyolefin and of the modified polyolefin, the adhesion between the outer layer and the intermediate layer and the smoothness of the casing are improved. However, in general, the amount of polyolefins and modified polyolefins in the outer layer does not exceed 3 to 10% by weight, so as not to substantially impair the water-absorbing properties and the strength of the outer layer. Optionally, the outer layer may further contain customary additives, such as matting agents to reduce the gloss of the casing. The outer layer readily accepts ink and can be provided with printing without problem.

The intermediate layer of the packaging casing is substantially impermeable to water vapor and does not absorb water. It should have a thickness of at least about 2 μm. In general, a thickness of between about 5 to 25 μm is sufficient to ensure that the casing possesses the necessary high degree of impermeability to water and water vapor that is required for the production of scalded and cooked sausages.

The intermediate layer comprises one or more polyolefinic compounds and an agent by which the adhesion between the two polyamide layers and the intermediate polyolefin layer is improved. This adhesion promoting agent may be homogeneously distributed throughout the cross-section of the intermediate layer or may be present on the surface only, i.e., in the areas immediately adjacent to the adjoining polyamide layers. In a first case, the intermediate layer comprises a single layer, and in a latter case, the intermediate layer is comprised of a polyolefin core layer that is provided on both of its surfaces with a coating layer comprising a polyolefin/adhesion promoting agent mixture or an adhesion promoting agent alone. This means that in the first case the casing wall comprises a total of three layers, whereas in the latter case the casing wall comprises a total of five layers. In view of the desirable low total thickness of the tubing wall of less than 60 μm and the possible low tubing diameter, it is preferable to use a casing having a total of three-layers in order to avoid difficulties relating to the construction of suitable coextrusion dies. In the preferred three-layered casing, the adhesion-promoting component is not applied between either the intermediate layer and the outer layer or between the intermediate layer and the inner layer, respectively, as an additional layer, but is instead incorporated into the intermediate layer. Accordingly, the adhesive bond between the intermediate polyolefin layer and the adjoining outer and inner polyamide layers is strengthened, and a firm composite film results from coextrusion so that even when the casings are subjected to hot water, no layer separation is observed.

In general, the adhesion-promoting component is present in an amount of from about 5% to about 50% by weight, preferably between about 10% to about 35% by weight, relative to the total weight of the polymer blend of the intermediate layer. It should be noted, however, that, in general the permeability of the intermediate layer to water vapor is increased by the functional groups of the adhesion promoting agent, so that the added amount of the adhesion promoting agent should be kept as low as possible. Usually, about 20% to 25% by weight of the adhesion promoting agent relative to the total weight of the polymer blend of the intermediate layer, is sufficient.

In general, the polyolefin of the central layer is a homopolymer of ethylene or propylene or a copolymer of linear alpha-olefins having 2 to 8 carbon atoms or a blend of several of these polymers. Suitable copolymers include $C_2/C_3$ copolymers and $C_3/C_4$ copolymers and also $C_2/C_3/C_4$ terpolymers. A mixture comprising $C_3/C_4$ copolymer and $C_2/C_3/C_4$ terpolymer is an exemplary suitable blend.

The adhesion-promoting agents are compounds known from the production of coextruded composite films from polar and non-polar plastics, such as polyamide and polyolefin. Usually, the adhesion promoting agents are polyolefin resins modified with functional groups. The resins comprise units of ethylene and/or propylene and optionally also other linear alpha-olefins having between 3 to 10 carbon atoms. The olefinic chain guarantees compatibility with the polyolefin of the central layer and the extrudability of the adhesion-promoting component. The functional groups in particular are units of vinyl acetate, vinyl alcohol, ethylenically unsaturated carboxylic acids, such as acrylic acid and methacrylic acid, and the esters and salts thereof, in particular the Na- and Zn- salts, and furthermore ethylenically unsaturated carboxylic acid anhydride groups. They impart an adequate wettability to the polyamide and polyolefin melts during coextrusion, so that a firm bond results.

Suitable adhesion promoters comprise, in particular, graft polymers, copolymers or terpolymers including ethylene or propylene units with at least one comonomer selected from the group including (meth)acrylic acid, (meth)acrylates (i.e., esters of n-alkanols having 1 to 6 carbon atoms, such as butyl acrylate), ethylene vinyl acetate and maleic anhydride. The units carrying functional groups are usually present in an amount of 3 to 12% by weight, based on the total weight of the adhesion-promoting polymer. The modified polyolefin resins also include rubber-modified polyethylene.

If the casing is to be dyed, it is expedient to work the dyestuff or color pigments into the central layer in order that any direct contact between the dyestuff or color pigments and the contents of the casing is avoided. This measure provides the added advantage that the stretching process is not impeded by the nucleating effect of color pigments. Color pigments can also be dispersed more uniformly and easily when the pigments are incorporated into the central layer.

In one embodiment, the inner layer is comprised of an aliphatic polyamide, aliphatic copolyamide or of a polymer blend incorporating at least one of these compounds. Further polymers, such as polyolefins, polyesters or ionomers may be present in the inner polyamide layer in an amount of up to 15% by weight. This means that the inner layer is comprised of a polymer or polymer blend of the type described above for the outer layer. However, the aliphatic polyamide used in the inner layer preferably has a lower water absorbing capacity than the aliphatic polyamide employed for the outer layer. Therefore, aliphatic polyamides having relatively long methylene chains, such as PA-11 or PA-12 or copolyamides comprising these units are advantageously used for the inner layer. The adhesion between the sausage composition and the inner layer can be improved by adding ionomers to the aliphatic polyamide. The layer of aliphatic polyamide or copolyamide protects the sausage meat from direct contact with the polyolefin. The oxygen barrier properties of the inner layer are, however, comparatively low. If the casing is to possess a reduced permeability to oxygen, the inner layer is comprised of a partially aromatic polyamide and/or a partially aromatic copolyamide. The partially aromatic polyamide or copolyamide is composed of aliphatic and aromatic units.

In a first embodiment of the partially aromatic polyamide, the aromatic units are predominantly or exclusively represented by the diamine units. Examples of these units include xylylene diamine and phenylene diamine units. The dicarboxylic acid units of this embodiment are exclusively or predominantly aliphatic units, and as a rule, they contain 4 to 10 carbon atoms. Preferred aliphatic dicarboxylic acid units include sebacic acid, azelaic acid and, in particular, adipic acid.

In a second embodiment of the partially aromatic polyamide, the aliphatic units are predominantly or exclusively represented by the diamine units, whereas the dicarboxylic acid units are predominantly or exclusively represented by radicals of aromatic dicarboxylic acids, in particular isophthalic acid and terephthalic acid. The aliphatic diamine units in general have 4 to 8 carbon atoms and, preferably, are caprolactam and/or hexamethylene diamine units. Preferably, the partially aromatic copolyamide of the second embodiment comprises units of caprolactam and/or hexamethylene diamine and units of terephthalic acid and/or isophthalic acid, and in particular it is PA 6I/6T.

In the first embodiment, the partially aromatic polyamide may contain up to 5 mol % of aliphatic diamine units and up to 5 mol % of aromatic dicarboxylic acid units. Likewise, in the second embodiment, the partially aromatic polyamide or copolyamide may contain up to 5 mol % of aromatic diamine units and up to 5 mol % of aliphatic dicarboxylic acid units.

It has, however, been found that inner layers exclusively comprised of partially aromatic polyamide and/or partially aromatic copolyamide are relatively inflexible and brittle and that the mutually adjoining inner surfaces of the laid-flat casing tend to stick together. As a result of the action of moisture contained in the packaged goods, there is, moreover, the danger of embrittlement of this kind of material.

In those cases where the casing is to be employed as a sausage casing, it is therefore especially advantageous to additionally incorporate aliphatic polyamides and/or aliphatic copolyamides into the inner layer. In particular in those cases where the partially aromatic polyamide or copolyamide responds to the above-described second embodiment, the partially aromatic polyamide is present in a blend with a saturated linear aliphatic polyamide and/or a saturated linear aliphatic copolyamide. Moreover, biaxial stretching can be particularly well performed with a tubing having an inner layer comprised of such a polyamide blend.

The additional aliphatic polyamide contained in the polymer blend of the inner layer is the product obtained from reacting an aliphatic dicarboxylic acid which preferably has 4 to 10 carbon atoms with aliphatic primary diamines which preferably have 4 to 8 carbon atoms. Examples of suited dicarboxylic acids include adipic acid, azelaic acid, sebacic acid and dodecanedicarboxylic acid. Examples of suited diamines include tetra-, penta-, hexa- and octamethylene diamine, with hexamethylene diamine being particularly preferred. Furthermore, the additional aliphatic polyamide of the polyamide blend can also comprise units of omega-aminocarboxylic acids having 6 to 12 carbon atoms or the lactams thereof, such as units of 11-aminoundecanoic acid, epsilon-caprolactam, or omega-lauric lactam. The aliphatic copolyamides in the blend with the partially aromatic polyamide or copolyamide may contain one or more of the above-described units of aliphatic polyamides. A preferred aliphatic copolyamide is comprised of units of caprolactam, hexamethylene diamine and adipic acid. Particular preference is given to PA 6, PA 66, PA 6/66, PA 11 and PA 12 or blends of these polymers, as further components of the inner layer in addition to the partially aromatic polyamide and/or copolyamide.

The proportion of the partially aromatic polyamide and/or copolyamide contained in the inner layer preferably is from about 5 to 85% by weight, particularly from about 10 to 40% by weight, based on the combined total weight of the polymer blend comprised of partially aromatic and aliphatic polyamides and/or copolyamides. In this range of the mixing ratio, a flexible inner layer is obtained that is nevertheless impermeable to oxygen. By increasing the content of partially aromatic polyamide/copolyamide, the adhesion between the sausage meat and the inner casing wall can likewise be increased, so that the properties of the casing can be varied in this respect, too, by increasing the amount of partially aromatic polyamide/copolyamide.

The tubular casing is preferably produced by coextrusion of the polymers forming the individual layers through an annular die, for example, by means of a device as described in EP-A-0,305,874. The casing is oriented by biaxial stretching and, consequently, exhibits its excellent resistance to deformation and good resilience properties. Stretching is performed at temperatures between approximately 70° and 95° C. in a stretch ratio of between approximately 2.4 to 3.1, both in the longitudinal direction and in the transverse direction. The surface area stretch ratio is approximately between 7 and 12. To improve the dimensional stability, the stretched casing can be partially or completely heat-set. This thermal treatment is usually carried out at temperatures of between 120° C. and 160° C. As a result of heat-setting, the shrink of the film at temperatures of up to about 90° C. is relatively low, i.e., a shrink of less than 20%, in particular of less than 15%, is measured both in the longitudinal direction and in the transverse direction.

The packaging casing can be processed into sausage casings without problems. Surprisingly, shirring can be performed without the addition of anti-blocking agents. It is sufficient to use the conventional shirring aids, such as paraffin oil and water. No shirring folds remain after the deshirring and stuffing of the casings.

The casing can be stuffed with sausage meat in a tight and crease-free manner, without undesirable bulging or delamination of the individual layers taking place. Even on heavy sausages having a diameter of more than 100 mm and a length of more than 60 cm, no formation of long tags nor of pear-shaped deformations nor bag-in-bag formation is observed during the subsequent heating of the sausages to core temperatures of about 80° C. The resulting sausages are cylindrical and have a uniform diameter over their entire length. Due to the good mechanical strength and resilience properties of the material, no expensive cooling of the sausages in cold water is required. It is sufficient to subject the sausages to short, intermittent rinsing with cold water and then to let them cool down in the ambient air.

Due to the improved barrier properties of the casings towards water vapor, scalded sausages surrounded by the casings of this invention can be stored for at least eight weeks without substantial weight loss or crease formation. As a result of the improved oxygen barrier properties, discoloration of liverwurst-type stuffings is observed markedly later than in the case of stretch-oriented PA 6 casings having the same wall thickness as the casings according to this invention. Sausages produced with the casings of this invention can be cut easily and without tearing. When the casing is peeled off helically, no layer separation occurs.

The invention will be explained in greater detail by means of the Examples which follow. In the Examples, percentages denote percent by weight.

EXAMPLE 1

A three-layered tubing having the following build-up is produced by means of a customary coextrusion method, using three single-screw extruders followed by an annular coextrusion die:
Outer layer: PA 6 (Grilon F 47)
Intermediate Layer: Dry blend comprising 80% of HDPE (Lupolen 2441 D); and 20% of adhesion promoter based on a LLDPE/methacrylic acid copolymer (Plexar OH 002)
Inner layer: PA 6 (Grilon F 47)
The extruded tubing has a diameter of 23 mm and a total wall thickness of 350 μm. The individual layers have the following thicknesses:
Outer layer: 220 μm
Intermediate layer: 90 μm Inner layer: 40 μm By means of IR radiation the tubing is heated to the required stretching temperature (about 80° C.) within two seconds. By applying a pressure of about 1 bar to the interior of the heated tubing, the tubing is stretched by a surface area factor of 8.6, subsequently heat-set in the inflated state, laid flat and wound up.

The resulting film has a total thickness of 40 μm. The individual layers have the following thicknesses:
Outer layer: 25 μm
Intermediate layer: 10 μm
Inner layer: 5 μm

EXAMPLE 2

A three-layered tubing having the following layer build-up is extruded, stretch-oriented and heat-set as described in Example 1:
Outer layer: PA 6 (Grilon F 47)
Intermediate layer: Dry blend comprised of 80% of HDPE (Lupolen 2441 D); and 20% of adhesion promoter based on a LLDPE/methacrylic acid copolymer (Plexar OH 002)
Inner layer: Dry blend comprised at 70% of PA 6 (Grilon F 47); and 30% of PA 6I/6T (Grivory G 21)

The thicknesses of the individual layers correspond to those of Example 1.

The following comparative tubings were produced:
a) a monolayered tubing of an oriented polyamide-/polybutylene terephthalate blend (oPA/PBT blend) according to DE-A-34 36 682,
b) a non-oriented monolayered blown tubing of polyamide 12 (noPA 12), and
c) a multilayered casing having the build-up polyamide-/adhesion promoting agent/polyethylene (PA/HV/PE) according to DE-A-38 16 942.

The mechanical data and barrier properties of these casings are compiled in Table 1 below. Table 2 shows the properties of the casings when being stuffed with sausage meat of the liverwurst type and of the slightly smoked ham sausage type. In this comparison, the advantages offered by the casings according to this invention become particularly apparent.

TABLE 1

| | Description of mechanical data and barrier properties | | | | | | | |
|---|---|---|---|---|---|---|---|---|
| | WD(1) (g/m²d), at 28° C., 85% rel. hum. | O₂, (2) (cm³/m²dbar), at 23° C., 53% rel. hum. | Tear strength (3) (N/m²) | | Elong. at break (%) | | Non-elastic proportion of film after stuffing (4) | Adhesive strength (after 15 min. in water of 80° C.) |
| | | | Longit. | Transv. | Longit. | Transv. | | |
| Example 1 | 5.7 | 19.7 | >80 | >100 | >80 | >80 | 0.6 | no mechanical separation possible |
| Example 2 | 5.7 | 10.5 | >80 | >100 | >80 | >80 | 0.6 | as in Example 1 |
| oPA6/PBT blend according to DE-A-34 36 682 | 12.0 | 20.0 | >150 | >140 | >100 | >60 | 0.6 | — |
| noPA 12 | 7.5 | 8.4 | 45–55 | 45–55 | 300–400 | 300–400 | 1.9 | — |
| PA/HV/PE according to DE-A-38 16 942 | 3.5 | 35.0 | >50 | >70 | >50 | >50 | 6.4 | partial mechanical separation into two layers possible |

(1) Permeability to water vapor, measured according to DIN 53 122
(2) Permeability to oxygen, measured according to DIN 53 380 at 23° C. and 53% relative humidity
(3) Determined according to DIN 53 455
(4) Determined by means of elongation/pressure curve, as described in DE-A-32 27 945

TABLE 2

| | Practical performance test using minced pork sausage and liverwurst stuffings, casing diameters 63 mm | | | | | |
|---|---|---|---|---|---|---|
| | Stuffing and scalding process | After storage for 12 weeks* | | Peeling and cutting behavior | Sausage meat adhesion, tested on minced pork sausage | Greying** |
| | | Weight Loss (% per week) | Crease formation | | | |
| Example 1 | A | 0 | none | C | good meat adhesion, no jelly deposition | no greying |
| Example 2 | A | 0 | none | C | as in Example 1 | as in Example 1 |
| oPA6/PBT blend according to DE-A-34 36 682 | A | 0.3 | after 6 weeks | D | as in Example 1 | as in Example 1 |
| noPA 12 | B | 0.5 | after 6 weeks | D | as in Example 1 | as in Example 1 |
| PA/HV/PE according to DE-A-38 16 942 | B | 0 | none | E | very good adhesion of meat, lumps of meat stick to the casing; no jelly deposit | greying starts after two weeks |

*storage at 4° C., at 75% relative humidity
**Test on liverwurst, stored in the light at 4° C. and 75% relative humidity
Evaluation of stuffing and scalding process:
A = tight, crease-free stuffing, no bulging or layer delamination
B = tight, crease-free stuffing, with a tendency to the formation of long tags and pear-shaped deformations
Evaluation of cutting and peeling behavior:
C = controlled cutting without tearing and continuous, controlled peeling-off without layer delamination are possible
D = controlled cutting and continuous, controlled peeling-off are possible
E = controlled cutting with partial layer delamination; no continuous, controlled peeling-off possible due to layer delamination It will be apparent to those skilled in the art that various modifications and variations can be made in the packaging casing of the present invention and in construction of this packaging casing without departing from the scope or spirit of the invention. Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A multilayered, tubular packaging casing for pasty materials having an outer layer, an intermediate layer and an inner layer wherein:

said outer layer comprises a polymer selected from the group consisting of an aliphatic polyamide, an aliphatic copolyamide and a polymer blend containing at least one aliphatic polyamide or aliphatic copolyamides;

said intermediate layer comprises a polyolefin and an adhesion promoting agent, said intermediate layer having a thickness of at least about 2 microns; and said inner layer comprises a polymer selected from the group consisting of an aliphatic polyamide, a partially aromatic polyamide, an aliphatic copolyamide, a partially aromatic copolyamide and a polymer blend containing at least one aliphatic polyamide, partially aromatic polyamide, aliphatic copolyamide, or partially aromatic copolyamide.

2. The casing as claimed in claim 1, wherein said aliphatic polyamide or copolyamide of said outer layer comprises units selected from the group consisting of an aliphatic primary diamine, an aliphatic dicarboxylic acid, an omega-aminocarboxylic acid, and a lactam of said omega-aminocarboxylic acid.

3. The casing as claimed in claim 2, wherein said aliphatic primary diamine has 4 to 8 carbon atoms.

4. The casing as claimed in claim 2, wherein said aliphatic dicarboxylic acid has 4 to 10 carbon atoms.

5. The casing as claimed in claim 2, wherein said omega-aminocarboxylic acid has 6 to 12 carbon atoms.

6. The casing as claimed in claim 3, wherein said aliphatic primary diamine comprises tetra-, penta-, hexa- or octamethylene diamine.

7. The casing as claimed in claim 4, wherein said aliphatic dicarboxylic acid comprises adipic acid, azelaic acid, sebacic acid or dodecane dicarboxylic acid.

8. The casing as claimed in claim 5, wherein said omega-aminocarboxylic acid comprises 11-aminoundecanoic acid, and the lactam of said omega-aminocarboxylic acid comprises omega-lauric lactam or caprolactam.

9. The casing as claimed in claim 1, wherein the outer layer comprises a polymer blend of polyamide and copolyamide and an additional component selected from the group consisting of polyolefins and modified polyolefins in an amount of up to 25% by weight of the outer layer.

10. The casing as claimed in claim 9, wherein said polyolefin is polyethylene.

11. The casing as claimed in claim 10, wherein said polyester is polybutylene terephthalate.

12. The casing as claimed in claim 9, wherein the additional component is a polyolefin present in an amount of up to 25% by weight of the outer layer.

13. The casing as claimed in claim 9, wherein the additional component is a modified polyolefin present in an amount of up to 25% by weight of the outer layer.

14. The casing as claimed in claim 9, wherein the additional component is selected from the group consisting of ionomers and polyesters in an amount of up to 15% by weight of the outer layer.

15. The casing as claimed in claim 9, further comprising an additional component selected from the group consisting of an ionomer and polyester in an amount of up to 15% by weight of the outer layer.

16. The casing as claimed in claim 1, wherein said polyolefin of said intermediate layer is selected from the group consisting of a homopolymer of ethylene, a homopolymer of propylene, a copolymer of linear alpha-olefins having 2 to 8 carbon atoms, and a mixture thereof.

17. The casing as claimed in claim 1, wherein said polyolefin of said intermediate layer comprises a copolymer selected from the group consisting of an ethylene/propylene copolymer, an ethylene/propylene/butylene copolymer, a propylene/butylene copolymer and a mixture thereof.

18. The casing as claimed in claim 1, wherein said adhesion promoting agent is present in the intermediate layer in an amount between about 5% to 50% by weight based on the total weight of said polyolefin and said adhesion promoting agent.

19. The casing as claimed in claim 18, wherein said adhesion promoting agent is present in the intermediate layer in an amount between about 10% to 35% by weight based on the total weight of said polyolefin and said adhesion promoting agent.

20. The casing as claimed in claim 1, wherein said adhesion promoting agent of said intermediate layer is a polyolefin resin modified by at least one functional group.

21. The casing as claimed in claim 20, wherein said functional group is selected from the group consisting of vinyl acetate, vinyl alcohol, and an ethylenically unsaturated carboxylic acid anhydride.

22. The casing as claimed in claim 1, wherein said aliphatic polyamide of said inner layer is selected from the group consisting of an aliphatic primary diamine, an aliphatic dicarboxylic acid, an omega-aminocarboxylic acid, and a lactam of said omega-aminocarboxylic acid.

23. The casing as claimed in claim 22, wherein said aliphatic primary diamine has 4 to 8 carbon atoms.

24. The casing as claimed in claim 23, wherein said aliphatic primary diamine comprises tetra-, penta-, hexa- or octamethylene diamine.

25. The casing as claimed in claim 22, wherein said aliphatic dicarboxylic acid has 4 to 10 carbon atoms.

26. The casing as claimed in claim 25, wherein said aliphatic dicarboxylic acid comprises adipic acid, azelaic acid, sebacic acid or dodecane dicarboxylic acid.

27. The casing as claimed in claim 22, wherein said omega-aminocarboxylic acid has 6 to 12 carbon atoms.

28. The casing as claimed in claim 27, wherein said omega-aminocarboxylic acid comprises 11-aminoundecanoic acid, and the lactam of said omega-aminocarboxylic acid comprises omega-lauric lactam or caprolactam.

29. The casing as claimed in claim 1, wherein said partially aromatic polyamide and/or partially aromatic copolyamide is present in said inner layer in an amount between 5% to 85% by weight based upon the combined total weight of the polymer blend in said inner layer.

30. The casing as claimed in claim 29, wherein said partially aromatic polyamide and/or partially aromatic copolyamide is present in said inner layer in an amount between 10% to 40% by weight based upon the combined total weight of the polymer blend in said inner layer.

31. The casing as claimed in claim 1, wherein said casing comprises a three-layered coextruded and biaxially stretch-oriented tubular film which optionally is also heat-set.

32. The casing as claimed in claim 1, wherein said casing has a total wall thickness between 30 and 60 μm, said outer layer having a thickness between 45% to 80% of said total wall thickness, said intermediate layer having a thickness between 5% to 40% of said total wall thickness, and said inner layer having a thickness between 2% and 35% of said total wall thickness.

* * * * *